United States Patent [19]

Kawahara et al.

[11] Patent Number: 5,246,377
[45] Date of Patent: Sep. 21, 1993

[54] APPARATUS FOR ELECTRICALLY CONNECTING A ROTARY CONNECTOR AND A WIRING HARNESS

[75] Inventors: Takashi Kawahara; Seiichi Ueno; Minoru Taoka, all of Tokyo; Tomoyuki Ohashi, Aichi, all of Japan

[73] Assignees: The Furukawa Electric Co., Ltd., Tokyo; Kabushiki Kaisha Tokai Rika Denki Seisakusho, Aichi, both of Japan

[21] Appl. No.: 909,636

[22] Filed: Jul. 7, 1992

[30] Foreign Application Priority Data

Jul. 9, 1991 [JP] Japan .................................. 3-167904

[51] Int. Cl.⁵ .............................................. H01R 39/02
[52] U.S. Cl. ........................................ 439/164; 439/15
[58] Field of Search ................................ 439/15, 164

[56] References Cited

U.S. PATENT DOCUMENTS 4,607,898  8/1986  Reighard et al. ................. 439/15 X Primary Examiner—Eugene F. Desmond
Attorney, Agent, or Firm—Frishauf, Holtz, Goodman & Woodward

[57] ABSTRACT

An electric connecting apparatus for setting up electric connection between wiring harnesses and a rotary connector having stationary and rotary casings and a flat cable housed therebetween. The apparatus is equipped with first and second apparatus sections each disposed on the rotary and stationary casing sides. The first section has a holder member formed on the rotary casing, a connector housing mounted to one end of the wiring harness, and a joint mold mounted to one end of the flat cable. The connector housing includes female terminals connected to odd end of the wiring harness and a connector housing main body for accommodating the female terminals. The joint mold includes tabs connected to odd end of the flat cable and a joint mold main body which supports the tabs. The second apparatus section has a cable lead-out section integral with the stationary casing, and a retaining key forcibly inserted into an open end portion of the cable lead-out section together with the connector housing, in place of the holder member. When the joint molds are connected to the connector housings each held in the holder member or the cable lead-out section, the electrical connection between the flat cable and the wiring harnesses is set up, with an engaging projection of the connector housing main body fitted into an engaging hole in the holder member to thereby lock the connector housing within the holder member.

6 Claims, 3 Drawing Sheets

APPARATUS FOR ELECTRICALLY CONNECTING A ROTARY CONNECTOR AND A WIRING HARNESS

BACKGROUND OF THE INVENTION

The present invention relates to a rotary connector for achieving electrical signal transfer between electric apparatuses/parts respectively provided at a stationary member and a rotary member, and more particularly, to an electric connecting apparatus capable of easily and reliably establishing electrical connection between a rotary connector and a wiring harness which is in turn used for establishing electrical connection between the rotary connector and an electric apparatus/part.

A typical rotary connector is equipped with a stationary casing provided on the side of a stationary member, a rotary casing provided on the side of a rotary member and rotatably fitted to the stationary casing, and a flexible flat cable housed between these casings in a spiral form. The flat cable is electrically connected to an electric apparatus/part (an electrical machinery and apparatus or a part of the same) through, e.g., a wiring harness. This type of rotary connector is mounted on an automotive steering device, for instance. In this case, the stationary casing of the rotary connector is fixed on a steering column, while the rotary casing is fitted to a steering shaft. The flat cable is further connected, via wiring harnesses, to various switches, an air bag inflator, etc. each provided on a steering wheel, and to a controller, a shock detecting sensor, a diagnosis unit, etc. respectively provided on a car body. When a driver operates the steering wheel to cause the rotary casing to rotate in unison with the steering shaft, the flat cable is caused to be wound or unwound. According to the aforementioned arrangement, the electrical signal transfer between the electric apparatus/part on the steering wheel side and the corresponding electric apparatus/part on the car body side can be achieved through the rotary connector, regardless of the rotary position of the steering wheel.

Conventionally, in the case of using wiring harnesses for electrical connection between a flat cable and electric apparatuses/parts, the flat cable and the wiring harnesses were connected by welding or the like before or after assembling a rotary connector. When welding the flat cable and the wiring harnesses before assembling the rotary connector, the rotary connector is assembled in such a manner that the flat cable is housed in between a stationary casing and a rotary casing and the wiring harnesses are disposed outside the two casings. Also, when welding the flat cable and the wiring harnesses after assembling the connector, the connector is assembled such that both ends of the flat cable are exposed outside the connector. Thus, an irksome or complicated welding process and irksome connector assembly are required for the electrical connection between the flat cable and the wiring harnesses.

OBJECT AND SUMMARY OF THE INVENTION

An object of the present invention is to provide an electric connecting apparatus capable of simply and firmly establishing electrical connection between a rotary connector and a wiring harness which is used to electrically connect the rotary connector and an electric apparatus/part.

Another object of the present invention is to provide a space-saving, compact apparatus for electrically connecting a rotary connector and a wiring harness.

A further object of the present invention is to provide an apparatus, which has simple construction, for electrically connecting a rotary connector and a wiring harness.

According to the present invention, there is provided an electric connecting apparatus for electrically connecting a rotary connector to a wiring harness including a plurality of wires, the rotary connector having a stationary casing and a rotary casing which are disposed for relative rotation, and having a flat cable housed in between these casings in a spiral form so as to be wound or unwound during the relative rotation of the casings and including a plurality of conductors. The electric connecting apparatus comprises a holder member formed at at least one of the stationary and rotary casings; a connector housing mounted on at least one end of either the wiring harness or the flat cable, said connector housing including female terminals which are electrically connected each to odd or respective one ends of counterparts or corresponding ones of the plurality of wires of the wiring harness and the plurality of conductors of the flat cable, and a connector housing main body which is fitted into the holder member and which houses the female terminals; a joint mold mounted on at least one end of the other of the wiring harness and the flat cable, said joint mold including tabs which are electrically connected each to odd ends of counterparts of the plurality of wires of the wiring harness and the plurality of conductors of the flat cable and to the female terminals, and a joint mold main body which is fitted into the holder member, and which supports the tabs; and a locking means provided in the holder member and the connector housing for locking the connector housing in a predetermined fitting position within the holder member.

Preferably, the locking means comprises an engaging projection formed on the connector housing main body, and an engaging hole which is formed in the holder member and into which the engaging projection of the connector housing main body is fitted. The connector housing main body is formed into being a stepped configuration, and the holder member is formed into a stepped configuration on which the stepped configuration of the connector housing main body is seated, so that the moment the stepped portion of the connector housing main body is seated on the stepped portion of the holder member, the connector housing is placed in the predetermined fitting position within the holder member. On an optimal basis, the electric connecting apparatus further includes a protective cover mounted on the holder member, and the holder member and the protective cover are provided with a second locking means for locking the protective cover in a predetermined mounting position on the holder member. For instance, the second locking means comprises an engaging projection formed on the holder member, and engaging hole which is formed in the protective cover and in which the engaging projection of the holder member is plugged. The protective cover is arranged so as to be mountable in the predetermined mounting position on the holder member only when the connector housing has been fitted in the predetermined fitting position within the holder member. The tabs of the joint mold are arranged in a row across the width of the flat cable, and the female terminals of the connector housing are arranged in a row. The row of the tabs is slightly longer than the width of the flat cable, and the row of the female terminals has a length which corresponds to that of the row of the tabs.

The present invention is advantageous in that the electrical connection between a flat cable, which is electrically connected to a joint mold, and a wiring harness, which is electrically connected to a connector housing, can be easily and assuredly established by connecting the connector housing to the joint mold held in a holder member. In order to embody the present invention, it is enough to provide the holder member on at least one of the stationary and rotary casings of the rotary connector, mount the connector housing on at least one end of either the wiring harness or flat cable, and mount the joint mold on at least one end of the other of the wiring harness and flat cable. This makes it possible to downsize the electric connecting apparatus, thereby saving a less space for installation. Providing the holder member and the connector housing main body with a locking means, and the holder member and the protective cover, with the second locking means, assures more reliable electrical connection between the flat cable and the wiring harness. Furthermore, in case that the tabs of the joint mold are arranged in a length which is slightly larger than the width of the flat cable and the female terminals of the connector housing are aligned, a more simplification of the electric connecting apparatus can be made available, and the electric connecting apparatus can be made thinner and significantly shorter, making the apparatus compact.

DETAILED DESCRIPTION

With reference to FIG. 1 through FIG. 5, an apparatus, according to an embodiment of the present invention, for electrically connecting a rotary connector to wiring harnesses will now be described.

Figure 1:
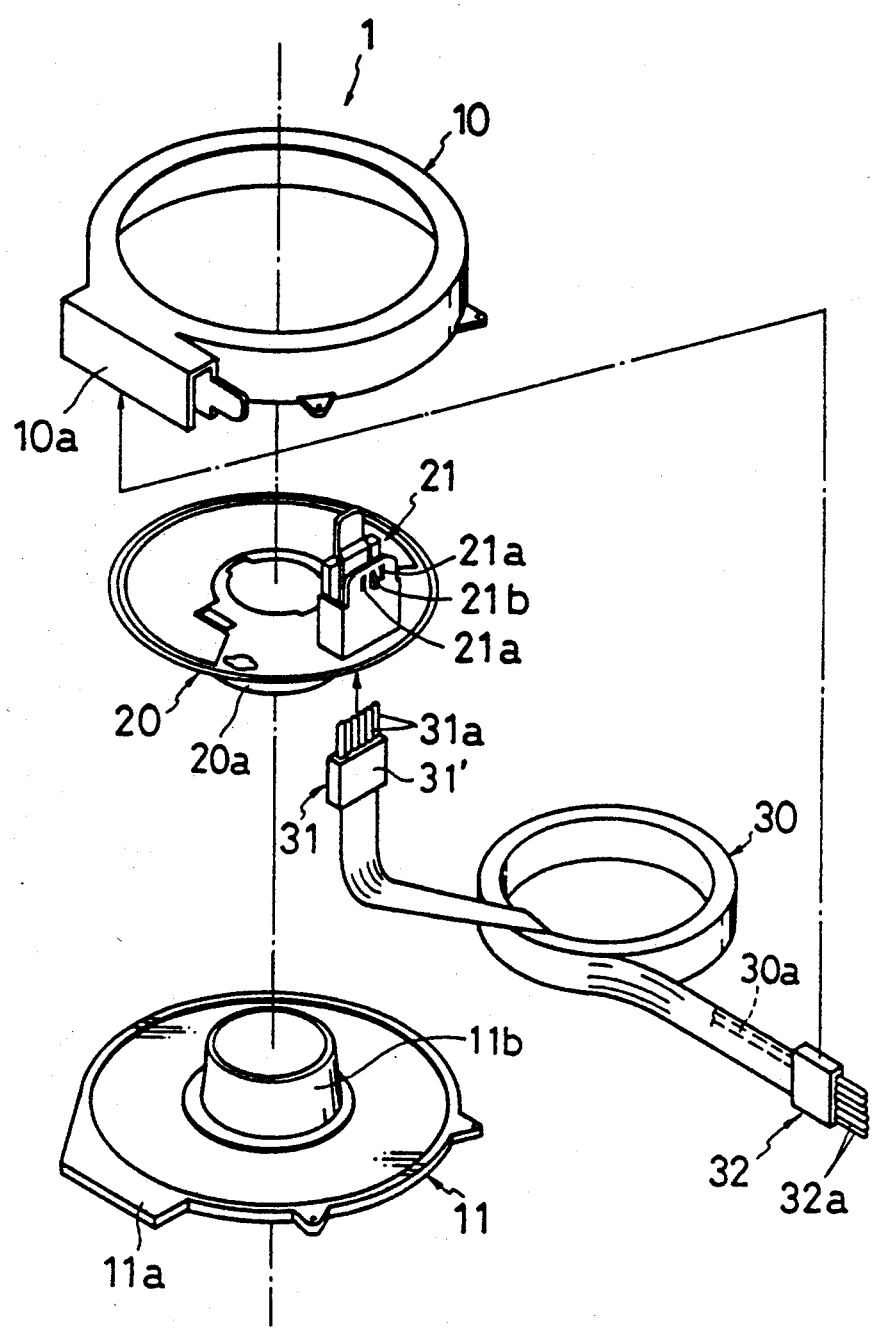
FIG. 1 is a perspective view showing a rotary-connector-side section of an unassembled electric connecting apparatus according to an embodiment of the present invention, together with a rotary connector.

A rotary connector 1, which is mounted on, e.g., an automotive steering device (not shown), is adapted to be connected via wiring harnesses (discussed later) to various electrical machinery and apparatuses or parts of the same (not shown) which are provided on the side of a steering wheel and on the side of a car body, respectively. As shown in FIG. 1, the rotary connector 1 is equipped with a stationary casing comprising a sub-stator 10 formed, as a whole, into an approximately cylindrical shape, with its top and bottom open, and a stator 11 formed into an approximately disc shape, a rotary casing comprising a rotator 20 formed into an approximately disc shape, and a flat cable 30 which has flexibility and which is housed within the two casings in a spiral form, the flat cable 30 including, for example, six conductors (one of them is denoted by reference numeral 30a).

The sub-stator 10 has a circumferential wall thereof formed at its one side with a projecting member 10a which is formed integrally with the wall and formed into an approximately inverted "U" shape in cross section. The projecting member 10a cooperates with a projecting flange 11a of the stator 11 to form a cable lead-out section for housing one end portion of the flat cable 30. The stator 11 is formed with a central opening (not shown), and a hollow cylindrical member 11b is formed integrally with the stator in alignment with the central opening. The rotator 20 has a hollow cylindrical member 20a which is formed integrally with the rotator and fitted into the stator cylindrical member 11b, so that a steering shaft (not shown) is disposed in such a manner that it extends through the central opening in the stator 11, the stator cylindrical member 11b, and the rotator cylindrical member 20a. More specifically, the rotator 20 is held by the sub-stator 10 and the stator 11 in such a manner that it is rotatable with respect to these stators so as to be wound or unwound, depending on the rotating direction of the rotator, when the rotator 20 coupled to the steering wheel through the steering shaft is rotated by a rotary operation of the steering wheel by a driver.

Figure 3:
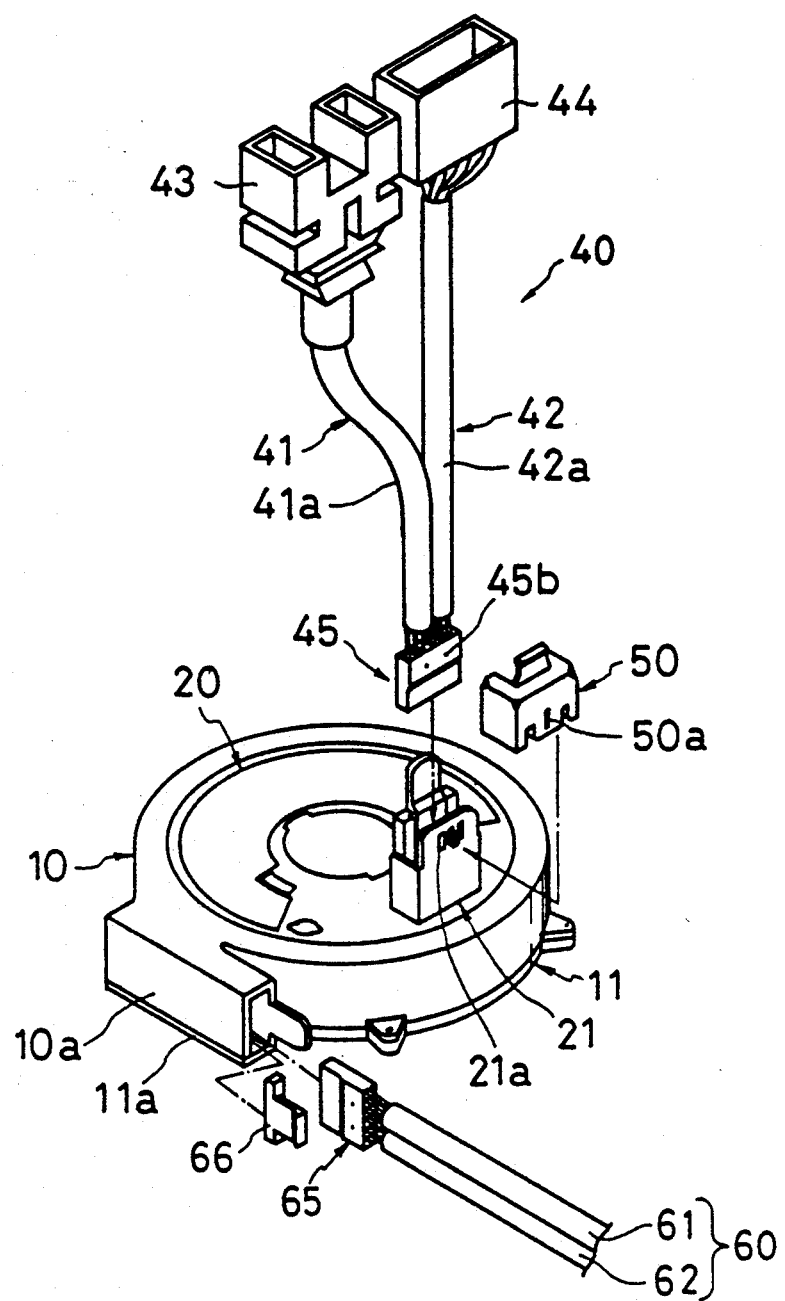
FIG. 3 is a perspective view showing a wiring-harness-side section of the electric connecting apparatus partially illustrated in FIG. 1, together with the rotary connector and wiring harnesses.

The apparatus for electrically connecting the rotary connector 1 with the wiring harnesses includes a first electric connecting apparatus section for electrically connecting the rotary connector 1 to the wiring harness associated with the rotary casing and shown by reference numeral 40 in FIG. 3, and a second electric connecting apparatus section for electrically connecting the rotary connector 1 to the wiring harness associated with the stationary casing and shown by reference numeral 60 in FIG. 3. The wiring harness 40 comprises a first and second lead wires 41 and 42 covered with a first and second insulating tubes 41a and 41b, respectively, each lead wire including, for instance, three wires. Just like the wiring harness 40, the wiring harness 60 comprises a first and second lead wires 61 and 62. In FIG. 3, reference numerals 43 and 44 denote connectors which are respectively connected to the outer ends of the lead wires 41 and 42.

The first electric connecting apparatus section has a connector holder member 21 as a connecting part, a joint mold 31 as a first connector half mounted to the end, on the rotator side, of the flat cable 30, and a connector housing 45 as a second connector half mounted to one end of the wiring harness 40; it is designed so that electrical connection between the flat cable 30 and the wiring harness 40 is established when the first and second connector halves 31 and 45 are interconnected.

Figure 2:
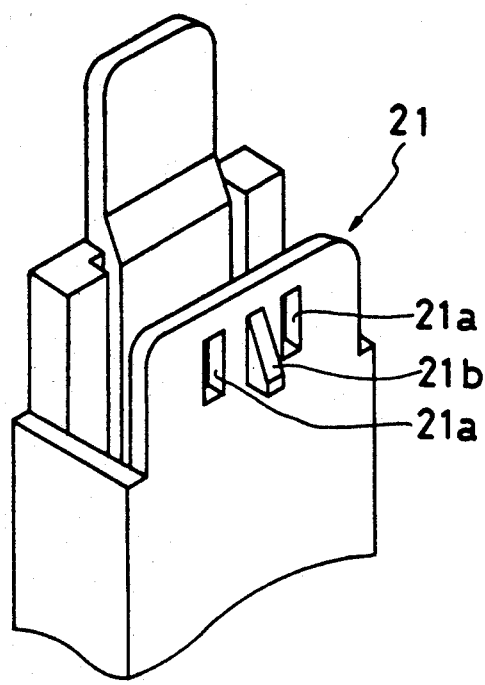
FIG. 2 is an enlarged perspective view of a holder member shown in FIG. 1.
Figure 5:
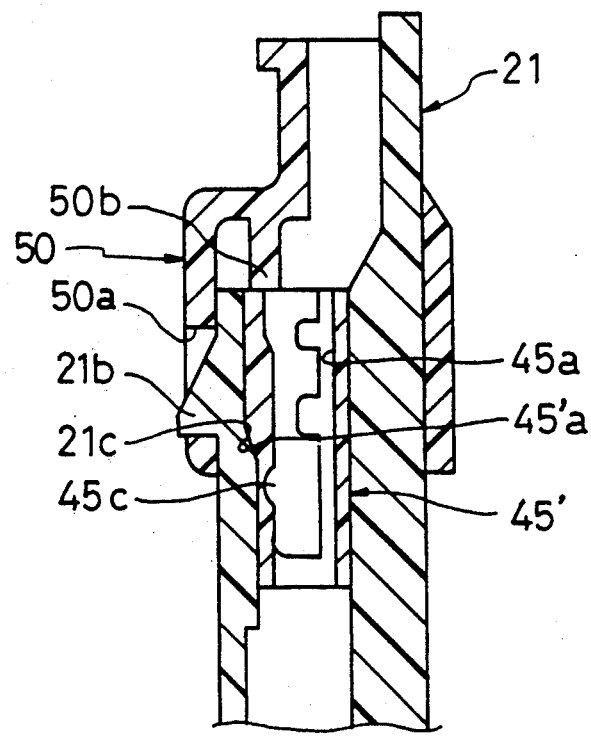
FIG. 5 is a cross-sectional view showing the holder member, the connector housing main body and a protective cover, with the latter two of which mounted on the holder member.

More specifically, as shown in FIGS. 2 and 5, a holder member 21 for holding the first and second connector halves 31 and 45 is formed, as a whole, into a shape which is rectangular in cross section, and is formed integrally with the rotator 20, its top and bottom being open. The holder member 21 is formed at the upper edge portion of its outer wall with two engaging holes 21a and an engaging projection 21b located between these holes 21a.

Figure 4:
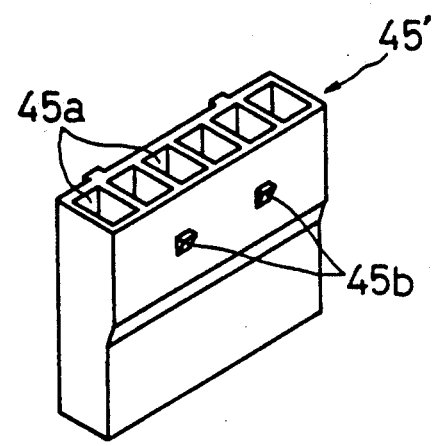
FIG. 4 is an enlarged perspective view illustrating the connector housing main body shown in FIG. 3.

As shown in FIGS. 4 and 5, the connector housing 45 includes a housing main body 45' which has as many female terminal receptacles 45a as the wires constituting the wiring harness 40, and female terminals 45c which are, for instance, forcibly inserted into the receptacles 45a. The female terminal receptacles 45a are aligned in a row, and therefore the female terminals 45c to be housed in the receptacles are also aligned. The row of the female terminals has a length which is slightly larger than the width of the flat cable. The connector housing main body 45' is made of synthetic resin, for example; therefore, the female terminals 45c contained in different female terminal receptacles 45a are electrically insulated from each other. The female terminals 45c are electrically connected to the respective one ends of the wires of the wiring harness 40 by welding, for example. On one side of the peripheral wall of the connector housing main body 45' are provided two engaging projections 45b which are formed integrally with the housing main body; below the engaging-projection-forming-portions of the peripheral wall of the housing main body is provided a stepped portion 45'a on which a stepped portion 21c formed on the holder member 21 can be seated. When the connector housing 45 is fitted into the holder member 21 to a predetermined fitting point (FIG. 5), the stepped portion 45'a of the housing main body is seated on the stepped portion 21c of the holder member, and the two engaging projections 45b are brought into engagement with two engaging holes 21a formed in the holder member 21, thereby locking the connector housing 45 in the predetermined fitting position. Thus, the engaging projections 45b constitute a locking means in cooperation with the engaging holes 21a.

Referring to FIG. 1 again, the joint mold 31 has tabs 31a, which are electrically connected to the respective one ends of the conductors of the flat cable 30, and a joint mold main body 31' supporting the tabs 31a. The tabs 31a are aligned in a row along the width of the flat cable 30, the row of the tabs having a length which is slightly larger than the width of the flat cable. The joint mold main body 31' is formed by injection molding, for instance, such that the tip portion of the flat cable, the welded portions of the conductors and tabs, and the proximal end portions of the tabs are embedded in the joint mold main body 31' with the flat cable conductors, the welded portions of the conductors and tabs, and the tabs all electrically insulated from one another. Additionally, the joint mold main body 31' is formed to have dimensions and a shape so that it can be fitted into the holder member 21. The female terminals 45c of the connector housing 45 are connected to the tabs 31a of the joint mold 31 which have been forcibly inserted into and fixed in the holder member 31.

The first electric connecting apparatus further includes a protective cover 50 (FIG. 5) which is mounted on the holder member 21. The protective cover 50 has an upper vertical wall which is located against an inner wall of the holder member 21, a horizontal wall which is integral part of with the upper vertical wall, and two lower vertical walls extending downward from the horizontal wall. The outer lower vertical wall is formed with an engaging hole 50a to be engaged with the engaging projection 21b of the holder member 21. The inner lower vertical wall 50b of the protective cover 50 functions as a stopper which allows the protective cover 50 to be installed in the predetermined mounting position (FIG. 5) on the holder member 21 only when the connector housing main body 45' is fitted in the predetermined fitting position (FIG. 5) within the holder member 21. In case that the connector housing main body 45', i.e., the connector housing 45, is in the predetermined fitting position in the holder member 21, the engaging projection 21b of the holder member fits into the engaging hole 50a of the protective cover 50 to lock the protective cover 50 in the predetermined mounting location when the protective cover 50 is mounted in the predetermined installing position on the holder member 21. Thus, the engaging projection 21b and the engaging hole 50a together function as a locking means.

As shown in FIG. 3, the second electric connecting apparatus section for electrically connecting the rotary connector 1 to the wiring harness 60 has a joint mold 32 mounted on the end of the flat cable 30 on the stator side, and a connector housing 65 mounted on one end of the wiring harness 60; it is designed so that electrical connection between the flat cable 30 and the wiring harness 60 is established when the joint mold 32 and the connector housing 65 are connected. The configuration and operation of the joint mold 32 are substantially the same as those of the joint mold 31 described above. Likewise, the configuration and operation of the connector housing 65 are substantially the same as those of the connector housing 45 described above. For these reasons, the explanation of the elements 32 and 65 is omitted.

The second electric connecting apparatus section is designed to achieve the function of the holder member 21 in the first electric connecting apparatus section, by means of a cable lead-out section, which is constituted by the projecting member 10a of the substator 10 and a projecting flange 11a of the stator 11, and a retaining key 66. More specifically, by forcibly inserting the retaining key 66 and the connector housing 65 into the cable lead-out section with the joint mold 32 fixed in the cable lead-out section, the joint mold 32 and the connector housing 65 are connected with each other, and the connector housing 65 is undetachably fixed to the cable lead-out section. Consequently, the sub-stator projecting member 10a, the stator projecting flange 11a, and the retaining key 66 function as the holder member. The second electric connecting apparatus section, which uses the cable lead-out section and the retaining key 66, requires a smaller space for installing it on the rotary connector 1 in comparison with the first electric connecting apparatus section which uses the holder member 21 shown in FIG. 3.

To assemble the rotary connector 1 and the first and second electric connecting apparatus sections which are configured as described above, at first, the joint mold 31 provided on one end of the flat cable 30 is forcibly inserted into and fixed in the holder member 21 which is formed as one piece with the rotator 20, then the substator 10 and the stator 11 are interconnected with bolts (not shown), with the rotator 20 caused to be fitted to the stator 11 on which the flat cable 30 is placed, and with the joint mold 32 provided on the other end of the flat cable 30 placed in the predetermined position on the projecting flange 11a. Next, the connector housing 45 connected to one end of the wiring harness 40 is caused to be fitted into the holder member 21. When the connector housing 45 fits into the predetermined fitting position in the holder member 21, the joint mold 31 and the connector housing 45 are connected with each other, to thereby establish electrical connection between the flat cable 30 and the wiring harness 40, and at the same time, the engaging projection 45b of the connector housing main body fits into the engaging hole 21a of the holder member, whereby the connector housing 45 is undetachably locked in the holder member 21. Further, when the protective cover 50 is mounted on the holder member 21, the engaging projection 21b of the holder member fits into the engaging hole 50a of the protective cover, whereby the protective cover 50 is undetachably locked by the holder member 21.

If an attempt is made to mount the protective cover 50 on the holder member 21 with the connector housing 45 incompletely fitted into the holder member 21 for some reason, the cover 50 cannot be mounted. In this case, the connector housing 45 needs to be properly installed to the holder member 21.

Then, when the wiring harness 60 as well as the retaining key 66 are forcibly inserted into the opening end portion of the cable lead-out sections 10a and 11a of the rotary connector 1, the joint mold 32 and the connector housing 65 are connected with each other, to thereby establish electrical connection between the flat cable 30 and the wiring harness 60, and at the same time, the retaining key 66 undetachably locks the connector housing 65 in the wire lead-out section.

The present invention is not limited to the foregoing embodiment, but various modifications thereof may be made.

For instance, in the embodiment, the electric connecting apparatus has been applied to establish electrical connection between the rotary connector and wiring harness which are installed on an automotive steering device, but the electric connecting apparatus of the present invention is also applicable to electrical connection between a rotary connector and a wiring harness in other applications than the steering device. Additionally, in the electric connecting apparatus according to the embodiment, the first electric connecting apparatus section has been used for connecting the flat cable to the wiring harness on the rotary casing side, while the second electric connecting apparatus section, which is different in construction from the first electric connecting apparatus section, has been used to connect the flat cable to the wiring harness on the stationary casing. However, electric connecting apparatuses having substantially the same configuration may be used for both rotary casing side and stationary casing side. Furthermore, it is not essential to use electric connecting apparatuses for the connection between the flat cable and the wiring harness on both casing sides. Instead, an electric connecting apparatus may be used only on one casing side.

What is claimed is:

1. An electric connecting apparatus for electrically connecting a rotary connector to a wiring harness which includes a plurality of wires, said rotary connector having a stationary casing and a rotary casing, which are disposed freely rotatably relative to each other, and a flat cable which includes a plurality of conductors and which is housed in a space between the stationary and rotary casings in a spiral form so as to be windable or unwindable during the relative rotation of the casings, said connecting apparatus comprising:

a holder member formed on at least one of said stationary casing and said rotary casing;

a connector housing mounted on at least one end of either said wiring harness or said flat cable, said connector housing including female terminals which are electrically connected each to outer ends of counterparts of said plurality of wires in said wiring harness and said plurality of conductors in said flat cable, said connector housing being coupled with said holder member and housing said female terminals;

a joint mold mounted on at least an outer end of the other of said wiring harness and said flat cable, said joint mold including tabs which are electrically connected each to outer ends of counterparts of said plurality of wires in said wiring harness and said plurality of conductors of said flat cable and to said female terminals, said joint mold being coupled with said holder member and supporting said tabs;

locking means provided in said holder member and said connector housing for locking said connector housing in a predetermined coupling position with said holder member;

a protective cover mountable on said holder member; and second locking means provided in said holder member and said protective cover for locking said protective cover in a predetermined mounting position on said holder member.

2. The electric connecting apparatus according to claim 1, wherein said locking means comprises an engaging projection on said connector housing main body, and an engaging hole on said holder member and into which said engaging projection of said connector housing main body is fitted.

3. The electric connecting apparatus according to claim 1, wherein said connector housing has a stepped portion, and said holder member has a stepped configuration on which said stepped portion of said connector housing is seated, so that when said stepped portion of said connector housing is seated on said stepped configuration of said holder member, said connector housing is placed in said predetermined coupling position within said holder member.

4. The electric connecting apparatus according to claim 1, wherein said second locking means comprises an engaging projection on said holder member, and an engaging hole in said protective cover and into which the engaging projection of said holder member is fitted.

5. The electric connecting apparatus according to claim 1, wherein said protective cover is arranged to be mountable in said predetermined mounting position on said holder member only when said connector housing has been fitted in said predetermined coupling position within said holder member.

6. The electric connecting apparatus according to claim 1, wherein said tabs of said joint mold are arranged in a row across the width of said flat cable, and said female terminals of said connector housing are arranged in a row, the row of said tabs having a length which is slightly larger than the width of the flat cable, and the row of said female terminals having a length which corresponds to the length of the row of the tabs.

* * * * *